United States Patent [19]

Salley

[11] Patent Number: 5,076,319
[45] Date of Patent: Dec. 31, 1991

[54] JET DISTRIBUTION VALVE ASSEMBLY FOR A SPA

[76] Inventor: Philip J. Salley, 7922 Avenida Kirjah, La Jolla, Calif. 92037

[21] Appl. No.: 557,533

[22] Filed: Jul. 24, 1990

[51] Int. Cl.⁵ .......................................... A61H 33/02
[52] U.S. Cl. .................................... 137/360; 137/876; 4/542
[58] Field of Search ..................... 4/542, 543, 544; 137/359, 360, 876, 625.11

[56] References Cited

U.S. PATENT DOCUMENTS

| 1,562,981 | 11/1925 | Muend | 137/360 |
| 1,602,544 | 10/1926 | Muend | 137/360 |
| 2,516,425 | 7/1950 | Sarver | 137/625.11 |
| 3,067,436 | 12/1962 | Freibott | 4/191 |
| 3,376,888 | 4/1968 | Anthony | 137/359 |
| 3,380,472 | 4/1968 | Leighton | 137/360 |
| 3,698,421 | 10/1972 | Kersten, Jr. et al. | 137/356 |
| 3,785,396 | 1/1974 | Morris et al. | 137/359 |
| 3,986,217 | 10/1976 | Doerr et al. | 4/542 |
| 4,189,792 | 2/1980 | Veach | 4/192 |
| 4,542,854 | 9/1985 | Mathis | 4/542 |
| 4,662,389 | 5/1987 | Iqbal | 137/359 |

FOREIGN PATENT DOCUMENTS 248057 5/1963 Australia .
550299 12/1955 Belgium .
1299739 12/1972 United Kingdom .

Primary Examiner—A. Michael Chambers
Attorney, Agent, or Firm—Nydegger & Associates

[57] ABSTRACT

A jet distribution valve assembly is provided for a spa having a threaded valve head and adjustable flange to engage the valve housing above and below the spa surface respectively to enable mounting of the valve assembly to the spa surface. Access to the interior of the valve assembly for servicing is provided simply by unscrewing the valve head from the valve housing.

12 Claims, 1 Drawing Sheet

JET DISTRIBUTION VALVE ASSEMBLY FOR A SPA

BACKGROUND OF THE INVENTION

1. Technical Field

The present invention relates to a valve assembly and more specifically to a valve assembly for a spa.

2. Background Information

A spa is an indoor or outdoor hot water bath which is designed for therapeutic purposes or simply for relaxation. A spa typically has jets for injection of pressurized fluid into the spa. The jets are positioned at spaced intervals below the water level of the tub and inject the fluid, which is usually either hot water, air, or a mixture of both, directly into the water in the tub. The jet streams contribute to the therapeutic or relaxing effect of the spa on a bather.

The injected fluid is pressurized by a pump which draws the injection water from the tub for recirculation and which draws the injection air from the atmosphere. The pump distributes the injected fluid at a desired pressure to the jets via a network of plumbing lines. Such spas may be provided with a valve which regulates the distribution of the injected fluid to the jets. The jet distribution valve is across the pump outlet line and is capable of diverting the injected fluid to any number of jets in various combinations, depending upon the configuration of the plumbing and the valve. A bather operates the valve via a control knob on the exterior of the spa.

A common problem encountered during operation of the jet distribution valve is the buildup of solid deposits in the valve which inhibit its effective operation. The deposits can be scale which forms from hard water used in the spa or the deposits can simply be an accumulation of dirt, plant matter, or other airborne particulates which fall into the tub and accumulate in the valve when the water is recirculated. Buildup of deposits can require frequent cleaning of the valve.

Unfortunately, servicing of jet distribution valves known in the art is made difficult because a skirt, enclosing the spa to conceal the pump and associated plumbing from bathers, limits access to the valve. Internal access to the distribution valve can be facilitated by providing a service door in the skirt. However, the distribution valve must then be positioned near the service door, which in turn restricts the positioning of the valve control knob without the use of a cumbersome extended linkage between the valve and control knob.

Known jet distribution valves are likewise difficult to service from the exterior of the spa. For example, one conventional jet distribution valve is mounted to the tub by an adhesive glue and a plurality of screws. The valve body is glued to the underside of the tub and a plate is provided on the top side of the tub through which the plurality of screws is driven into the valve body to secure the plate thereto.

External servicing of the valve is only accomplished by removing the plurality of screws from the top plate and subsequently removing the plate. However, this is a laborious task which is not entirely satisfactory, oftentimes requiring the attention of a skilled service person. Furthermore, it has been found necessary to provide a water tight seal across the lip opening, which receives the control knob linkage, to prevent water intrusion into the spa interior. Since the top plate is not suited to perform this function, it has been necessary to provide the watertight seal at the less accessible glue joint in the spa interior.

As such, a spa valve assembly is needed which obviates the problem of access to the components of the valve assembly in a practical manner. Particularly, a valve assembly is needed which enables convenient access to the valve assembly for servicing while enabling placement of the valve control knob on the spa at a location convenient to the user.

SUMMARY OF THE INVENTION

The present invention is a valve assembly mountable to a planar surface. The valve assembly has a valve housing which defines a valve seat in which the movable valve element sits. The valve assembly is mountable to the surface by exterior mounting threads formed in the valve housing which extend above and below the planar surface when the assembly is in a mounting position. An adjustable flange engages the threads below the surface and a valve head engages the threads above the surface. The position of the flange is adjusted such that when the valve head is tightened down onto the surface, the flange and valve head form a tight mount onto the surface. The valve is controlled by means of a control knob on the end of a valve stem which extends from the valve element through a bore in the valve head.

In the preferred embodiment, the planar surface is the spa enclosure. A fluid tight seal is provided between the valve head and enclosure as well as between the bore and stem to prevent water from leaking under the enclosure. The valve housing has an inlet from a fluid pump and one or more outlets, each of which feed one or more fluid jets in the spa.

It is apparent that the fluid sealable valve head and adjustable flange enable one to mount the present valve assembly at virtually any location on the spa enclosure regardless of its thickness for convenience of use, including on the skirt or in the tub. Furthermore, the valve head is threadably mounted to the valve housing by hand tightening, which enables access to the interior of the valve from outside the spa enclosure. Thus, the valve element can easily be removed from the valve housing at any time for cleaning or servicing by the spa user without accessing the spa enclosure. This avoids expensive service calls for maintenance of the valve.

DESCRIPTION OF PREFERRED EMBODIMENTS

Figure 1:
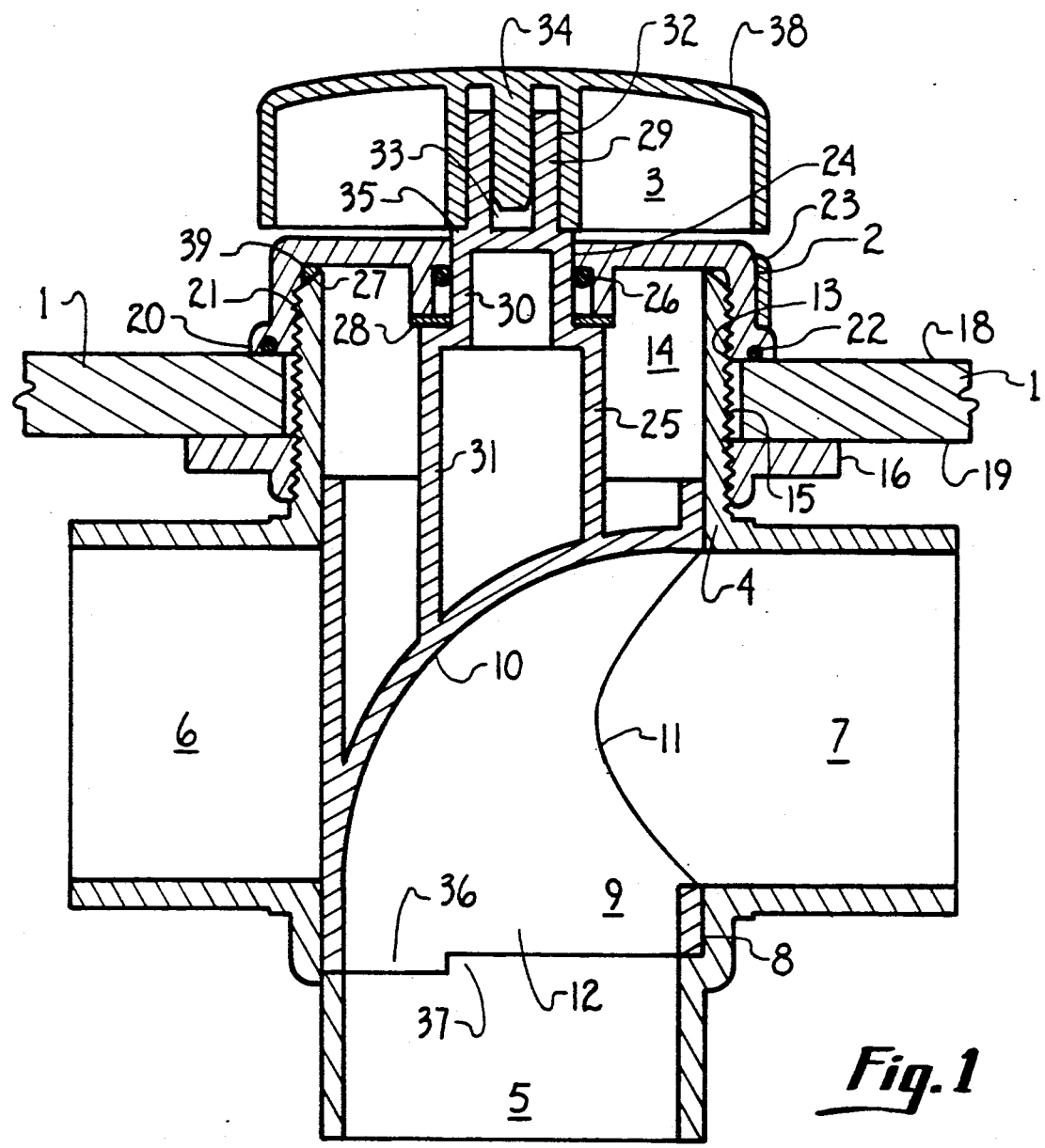
FIG. 1 A cutaway side view of the present valve and control assembly.
Figure 2:
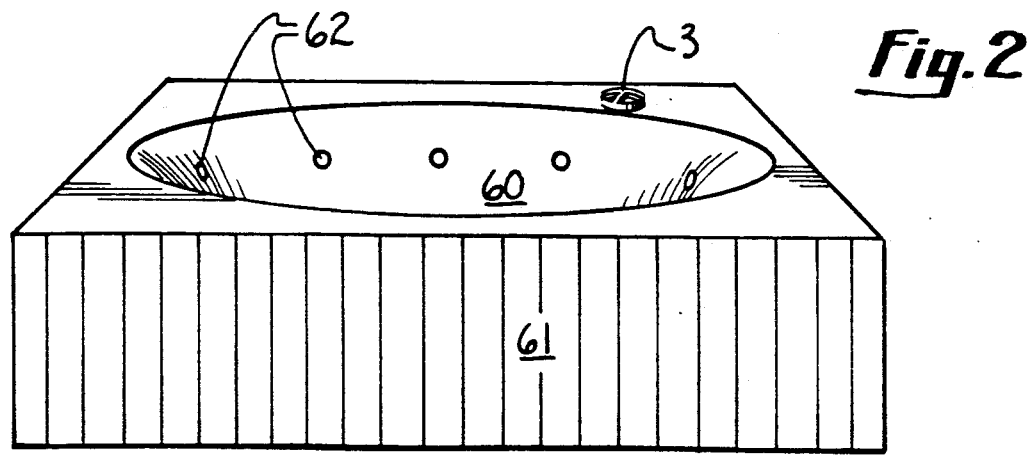
FIG. 2 A perspective of the spa enclosure.

The invention is described below with reference to the drawings. FIG. 1 shows the valve assembly of the present invention mounted to the spa enclosure 1. Only the valve head 2 of the assembly and control knob 3 are exposed to the user above the spa enclosure 1. The remainder of the valve assembly is concealed from the user either by positioning it beneath the spa enclosure 1 or by positioning it above the enclosure, but covered by the valve head 2 and control knob 3. The spa enclosure 1 as defined herein comprises the tub 60 and skirt 61 shown in FIG. 2 which form the exterior surface of the spa visible to the user.

The present valve assembly has a valve body 4 which is a hollow cylindrical housing having an inlet port 5 and two outlet ports 6 and 7 formed therethrough. Inlet and outlet ports 5, 6 and 7 can be slip-fitting connections to the spa plumbing lines. By providing the slip-fitting connections in conjunction with reducing bushings, a maximum sized valve assembly can be adapted to accommodate many different sized plumbing lines.

A cylindrical valve seat 8 defined by the interior of a lower portion 9 of the valve body 4 houses a valve element 10. The valve element 10 is a complementary cylindrical member which is rotatably fitted in the valve seat 8 in the manner shown. The valve element 10 is essentially a pipe open at one end 12 and closed at the other end, while having a hole 11 in its sidewall.

The valve element 10 enables the user to control the distribution of fluid entering the assembly through the valve inlet port 5 which is in fluid communication with a remote pump not shown. The fluid entering the assembly passes through open end 12 and hole 11 and, depending on the position of the element 11, out one of the outlet ports 6 and 7 in the lower portion 9 of the valve body termed the housing portion. Each outlet port 6 and 7 feeds one or more jets 62 shown in FIG. 2 through a network of concealed plumbing lines and manifolds not shown.

By turning the valve element 10 in either direction and aligning the hole 11 with a desired outlet port 6 or 7, the user can divert the entire flow from the valve inlet port 5 to the desired outlet port 6 or 7. Alternatively, the valve element 10 can be turned to partially align the hole 11 with both outlet ports 6 and 7 simultaneously so that partial flow from the valve inlet port 5 is simultaneously provided to both outlet ports 6 and 7. Finally, the valve element 10 can be turned so that hole 11 does not align with either port 6 and 7, thereby shutting off all flow to the jets. In FIG. 1 the hole 11 is aligned with outlet port 7 such that the valve element 10 diverts the entire flow from the valve inlet port 5 to the outlet port 7.

The valve body 4 is provided with an integral mounting means 13 on an upper portion 14 of the valve body termed the mounting portion. The integral mounting means 13 is external threads formed on the exterior surface of the mounting portion 14. The top of the mounting portion immediately above the external threads is beveled to provide a seat 27 for an internal o-ring 39.

The valve body 4 is positioned beneath the spa enclosure 1 and an opening 15 is provided in the spa enclosure 1 to receive the mounting portion 14. The mounting means 13 extends through the opening 15, protruding above the spa enclosure 1 a sufficient length to enable attachment of the valve head 2 to the protruding portion of the mounting means 13. The length by which the mounting means 13 protrudes through the opening 15 is determined by the selected location of an adjustable flange on the mounting means 13 in the manner shown below.

The adjustable flange 16 is a ring-shaped member having internal threads 17 compatible with the external threads 13 of the valve body 4. The flange 16 facilitates mounting the valve assembly to the spa enclosure 1. The flange 16 is adjustably mounted on the external threads 13 of the valve body by hand screwing the flange 16 thereon a distance which is defined by the thickness of the spa enclosure 1. The flange 16 is adjustably positioned on the valve body 4 beneath the spa enclosure 1 such that when the valve head 2 is mounted onto the mounting means 13 protruding through the spa enclosure 1, the valve head 2 and adjustable flange 16 tightly engage the upper and under surface 18 and 19 of the spa enclosure 1 respectively. Further, the flange 16 is positioned such that substantially no portion of the mounting means 13 is visible above the spa enclosure 1 to create an aesthetically pleasing effect.

The valve head 2 provides a cap over the mounting portion 13 of the valve body 4. The valve head 2 has a lip 20 with interior threads 21 compatible with the mounting means 13. The valve head 2 is threadably attached to the mounting means 13 to tightly engage the upper surface 18 of the spa enclosure as disclosed above. An external o-ring 22 is provided in the portion of the lip 20 of the valve head 2 abutting the spa enclosure 1 to provide a fluid tight seal which prevents the intrusion of water across the opening 15 into the interior of the spa enclosure 1. The internal o-ring 39, when compressed as shown, provides a further seal across the mounting means 13.

The valve head 2 is provided with a plurality of ribs 23 around its external circumference which facilitate gripping the valve head 2 and enable hand tightening and loosening of the valve head 2 onto or off of the mounting means 13 respectively. The valve head 2 is further provided with a bore 24 through its center to sealably and rotatably engage the valve stem 25 as described below. The bore 24 is provided with o-ring 26 around its circumference which fits against the valve stem 25 to provide a fluid tight seal. A washer 28 is additionally provided around the valve stem 25 which engages the valve head 2 about the bottom of the bore 24 to facilitate a secure fit of the valve head 2 onto the mounting means 13.

The valve stem 25 is an elongated member integrally connected to the top of the valve element 10. The valve stem 25 protrudes out through the top of the mounting portion 14 of the valve body 4 when the valve element 10 is positioned in the valve seat 8. The stem 25 also protrudes through the stem bore 24 in the valve head 2, a sufficient distance to enable attachment of the control knob 3 to the stem 25, when the head 2 engages the mounting means 13.

The valve stem 25 comprises three stages 29, 30 and 31 of progressively increasing cross-section from the top to the bottom of the stem 25. The first or top stage 29 of the stem is the narrowest stage and is hexagonally shaped to fit into a corresponding hexagonal stem hole 32 in the underside of the knob 3. The top stage 29 of the stem also has a hexagonal opening 33 on its top where it fits into the control knob 3 to receive a corresponding hexagonal pin 34 extending axially from the bottom of the control knob 3. The control knob 3 is fixably mounted to the top stage of the stem 29 by placing the hexagonal pin 34 of the knob 3 in the opening 33 of the stem and applying a downward force on the knob 3 until it abuts the shoulder 35 of the second or middle stage 30 of the stem 25. The pin 34 and hole 33 arrangement provides a tight mount of the knob 3 to the valve stem 25. If desired, the knob 3 may be removed by applying an upward force to it.

The second stage 30 is cylindrical, but slightly smaller in diameter than the diameter of the bore 24 through the valve head 2. The relative diameter of the second stage 30, along with the o-ring 26 in the bore 30 of the valve head 2, enables a tight but rotatable fit of the valve head 2 against the valve stem 25.

The valve element 10 can be provided with a stop to enable the user to more easily adjust the valve element 10 to a desired rotational position relative to the outlet ports 6 and 7. In the present embodiment, the stop is shown as a first tab 36, which extends below the lower edge of the valve element, and a corresponding second tab 37 on the shoulder of the valve seat. When the two tabs 36 and 37 abut each other, further rotation of the valve element 10 is prevented in the direction of abutment and rotation can only be affected in the reverse direction until the tabs 36 and 37 abut each other in that direction.

In an alternate embodiment of the stop, the two tabs 36 and 37 can be placed with one on the underside of the control knob 3 and the other on the top of the valve head 2 respectively. When the control knob 3 is rotated, the valve head 2 remains fixed and abutment of the tabs restricts further rotation in the same manner as described above.

The control knob 3 is the actual means by which the user manually controls the position of the valve element 10 and thus the distribution of fluids to the outlet ports 6 and 7. The valve stem 25 mechanically links the control knob 3 to the valve element 10 Rotation of the control knob 3 correspondingly rotates the valve element 10. The top of the control knob 3 is provided with a raised hand grip 38 to facilitate manual rotation of the knob 3.

Servicing of the valve assembly to clean the valve element 10 in the valve seat 8 is readily performed from the exterior of the spa enclosure 1 by disengaging the valve head 2 from the mounting means 13. This is performed by simply unscrewing the valve head 2 by hand from the mounting means 13. The valve element 10 is then lifted by the control knob 3, valve head 2 and stem 25 from the valve seat 8 through the spa enclosure 1 while the valve body 4 and adjustable flange 16 are retained in place beneath the spa enclosure 1.

At this time, the valve element 10 and valve seat 8 are clearly accessible and can be cleaned of any deposits. Any worn valve components can also be replaced if desired. The valve is reassembled by reversing the disassembly steps recited above. It is apparent that a user can easily service the valve from the exterior of the spa enclosure without having to access the interior of the enclosure.

Although the embodiment of the present invention shown above is a three-way valve assembly, the invention is not limited to this configuration. It is apparent from the disclosure that the present invention applies likewise to virtually any number of known valve configurations, including two-way valves, four-way valves, five-way valves, etc. The invention applies to valve configurations having one or more inlet ports and one or more outlet ports in any combination.

The valve assembly may be fabricated from any known material. In a preferred embodiment, the valve assembly is fabricated from molded and/or machined plastic. In a most preferred embodiment, the entire valve body 4 is molded in plastic as a single integral unit. Likewise, the valve stem 25 and valve element 10 are molded in plastic as a single integral unit.

While the foregoing preferred embodiments of the invention have been described and shown, it is understood that alternatives and modifications, such as those suggested and others, may be made thereto and fall within the scope of the invention.

I claim:

1. A valve assembly mountable to a planar surface comprising:
   a valve housing defining a seating means internal thereto and having a continuous set of threads formed on the external surface thereof extendable above and below said planar surface;
   a diversion means for diverting fluid flow through said valve housing means, said diversion means rotatably positioned within said seating means;
   a control means for controlling the position of said diversion means in said seating means;
   a linking means for linking said control means to said diversion means;
   a head means having internal threads for releasably engaging said continuous set of threads above the planar surface, said head means adapted for sealably abutting an upper side of the planar surface and having a bore through which said linking means passes;
   a flange means having internal threads for adjustably engaging said continuous set of threads below the planar surface, said flange means adapted for abutting an under side of the planar surface; and
   wherein said diversion means is adapted to be slidably removable from said seating means through said valve housing above said planar surface when said internal threads of said head means are released from said continuous set of threads.

2. The valve assembly of claim 1 further comprising a sealing means providing a fluid seal between said bore and said linking means.

3. The valve assembly of claim 1 wherein said head means comprises an o-ring to sealably abut the upper side of the planar surface.

4. The valve assembly of claim 1 wherein said head means sealably abuts said upper side of the planar surface by hand tightening said internal threads onto said continuous set of threads.

5. The valve assembly of claim 1 wherein said control means, linking means, and diversion means are rotatable independent of said head means.

6. The valve assembly of claim 1 wherein said flange means adjustably engages said continuous set of threads at a point in response to the thickness of the planar surface.

7. A jet distribution valve assembly for diverting a fluid exiting a pump to at least one fluid jet of a spa, said assembly mounted to a spa enclosure with a portion of said assembly above said enclosure and another portion of said assembly below said enclosure, said assembly comprising:
   a valve housing having a valve inlet port in fluid communication with said fluid pump and having one or more valve outlet ports, each outlet port in fluid communication with said at least one fluid jet, said valve housing further having external threads above said inlet port and said one or more outlet ports, wherein said external threads extend continuously above and below said enclosure;
   a valve seat defined by the interior of said valve housing;
   a valve element rotatably positioned within said valve seat for diverting fluid flow from said pump and inlet port through said one or more outlet ports to said fluid jets;
   a control knob for controlling the position of said valve element in said valve seat thereby determining the amount of fluid diverted from said inlet port to each of said one or more outlet ports;

a valve stem connecting said control knob to said valve element;

a valve head having internal threads releasably threaded onto said continuous external threads above said enclosure and forming a seal where said valve head abuts an upper side of said enclosure, said valve head having a bore through which said valve stem rotatably extends between said valve element and said control knob, said valve element slidably removable through said valve housing above said enclosure upon release of said internal threads of said valve head from said continuous external threads; and an adjustable flange having internal threads adjustably threaded onto the continuous external threads of said valve housing below said enclosure and abutting an under side of said enclosure.

8. The jet distribution valve assembly of claim 7 wherein said valve stem and valve element are an integral unit of molded plastic.

9. The jet distribution valve assembly of claim 7 further comprising a bore o-ring fitted around the perimeter of said bore to abut said valve stem and provide a fluid seal therebetween.

10. The jet distribution valve assembly of claim 7 wherein said valve housing is an integral piece of molded plastic.

11. The jet distribution valve assembly of claim 7 wherein said adjustable flange adjustably engages said external threads at a point in response to the thickness of said spa enclosure.

12. The jet distribution valve assembly of claim 7 wherein said valve stem releasably connects said control knob to said valve element.

* * * * *